Patented Dec. 7, 1943

2,336,195

UNITED STATES PATENT OFFICE 2,336,195

LUBRICATING COMPOSITION

William J. Sparks and Raphael Rosen, Elizabeth, N. J., assignors, by mesne assignments, to Jasco, Incorporated, a corporation of Louisiana No Drawing. Application May 9, 1941
Serial No. 392,733

8 Claims. (Cl. 252—59)

This invention is concerned with improving viscosity characteristics of hydrocarbon oils by the addition of normal mono-olefin polymers.

A specific object of this invention is to utilize normal mono-olefin polymers with practical and optimum effectiveness as viscosity index improving agents in hydrocarbon lubricating oils.

While the high molecular weight polymers of iso-olefins, notably isobutylene polymers, are known to be meritorious viscosity index improvers, disconcertingly the ordinarily available polymers of normal mono-olefins fail to act effectively in the same manner, even though they possess certain advantages in their stability to thermal decomposition. The iso-olefin polymers of corresponding molecular weight are found to raise the viscosity index of an oil in proportion to their molecular weight and concentration, but the high molecular weight normal mono-olefin polymers were found to be only slightly soluble in hydrocarbon lubricating oils and to have a viscosity improving effect of an unsatisfactorily low order, becoming worse in proportion to the molecular weight and to their concentration in the oil for this function.

It is determined in accomplishing the objects of the present invention that normal mono-olefin polymers possessing suitable solubility can be obtained for use as lubricating oil blending agents, and can be effectively used to improve the viscosity of hydrocarbon lubricating oils in certain concentrations; also, that their effects can be amazingly enhanced by proper additions of auxiliary blending agents belonging to the class of substances which are complex condensation products of aliphatic reactants.

There are various commercial methods of obtaining the high molecular weight polymers of normal mono-olefins. While these methods are not considered as part of the present invention, one of the important methods developed for manufacturing these polymers will be explained for clarity.

A high molecular weight polymer of a normal mono-olefin is obtained, for example, by compressing the olefin, such as ethylene or propylene, to a high superatmospheric pressure in excess of 500 atmospheres, preferably to within the range of about 1000 to about 3000 atmospheres and allowed to react under controlled temperature conditions, preferably with a small quantity of oxygen admixed in order to catalyze the polymerization. The polymerization proceeds at moderately elevated temperatures in the range of 100° C. to 400° C., and preferably the temperature is kept in the range of 150° C. to 250° C. For a given concentration of oxygen, the molecular weight of the polymer is greater when the polymerization proceeds at elevated pressures and the relatively low temperatures. The optimum concentration of oxygen is in the range of 0.01% to about 3%.

As a specific example of the polymerization technique, ethylene polymers having molecular weights above 2000 are obtained when ethylene and 0.05% of admixed oxygen are compressed in a steel bomb with a total pressure of about 1500 atmospheres and are maintained at a temperature of 210° C. for about five hours. The polymer product thus obtained is a plastic solid which softens at a temperature of about 100° C. to 120° C.

The normal mono-olefin polymers have a hydrogen to carbon ratio of substantially 2:1, which indicates that the polymers are true polymers of the normal mono-olefin and can be represented by the formula:

$$H(CH_2)_nCH=CH_2$$ 

wherein the subscript $n$ denotes a high number of the interlinked methylene groups. These polymers are composed almost entirely of hydrogen and carbon, but some small amount of oxygen may be chemically combined. They are further characterized by a low solubility in hydrocarbon liquids at ordinary temperatures; for example, they dissolve in aromatic hydrocarbons, such as benzene or xylene only at temperatures near the boiling point of these hydrocarbons and are still less soluble in paraffinic hydrocarbons or petroleum oils. They have molecular weights estimated to range from about 2000 to 24,000 or higher.

In attempting to blend normal mono-olefin polymers made available by common methods of their manufacture, it was found that their solubility is negligible in low viscosity index light lubricating oils with even a high aromatic hydrocarbon content, and they tend to precipitate out from the oil on standing. Also they exhibit a considerably adverse effect on the viscosity index of the oil as their concentration is increased.

Now, it is found that a decided improvement is made in the normal olefin polymers, for the purpose of the present invention, by lowering their aggregate molecular size to a certain extent determined by measurements of their intrinsic viscosities, as will be hereinafter explained.

The relationship between the nature of the normal mono-olefin polymer and its suitability as a blending agent in hydrocarbon oils is satisfactorily determined in terms of the intrinsic viscosity of the polymer, using a method which follows that of E. O. Kraemer described in the Industrial Engineering Chemistry Journal, vol. 30, page 1200, 1938. The specific viscosity, $\eta r$, is the viscosity of a solution of the polymer relative to the viscosity of the solvent at a given temperature. The intrinsic viscosity, $[\eta]$, is equal to the natural logarithm of the specific viscosity divided by the concentration, $c$, of the polymer in grams per 100 cc. of the solution:

$$[\eta] = 1n \frac{\eta r}{c}$$

In determining the specific viscosities, the polymers are dissolved in a solvent in a low concentration, and the viscosity is measured at a fixed temperature. The intrinsic viscosity is indicative of the molecular size of the polymer, being proportional to the molecular weight of the polymer.

It is found that the normal mono-olefin polymer should have an intrinsic viscosity at 210° F. not exceeding 0.25 and preferably between about 0.1 and 0.25 to be satisfactorily soluble and useful as a viscosity improving agent in mineral lubricating oils.

The effectiveness of the normal mono-olefin polymers which can be employed as blending agents in the lubricating oils is very sensitive to concentration changes and to certain auxiliary blending agents. These normal mono-olefin polymers can be satisfactorily blended in concentrations of from 0.1% to about 1% by weight, but are preferably incorporated in a concentration of from 0.2% to 0.75% by weight, if used without an auxiliary blending agent.

The auxiliary blending agent, in general, has an optimum effect in very small concentrations of from 0.1% to about 1% by weight, but may be used in somewhat higher concentrations, such as 2% to 5%, without any substantial advantage in its effect on the polymer and to some extent a depressing effect on the viscosity index.

The substances now found to function as valuable auxiliary blending agents for improving the effectiveness of the mono-olefin polymers blended in lubricating oil may be chiefly characterized as complex organic compounds synthesized by chemical condensation and containing a multiplicity of aliphatic groups, particularly a multiplicity of long chain alkyl groups. These compounds have boiling points above 600° F., molecular weights above 500, and substantial compatibility with hydrocarbon oils.

Typical examples of suitable auxiliary blending agents for the present purposes are polymerized alkylated aromatic compounds, e. g., polyalkyl naphthalenes and polyalkyl phenols, polyalkyl methacrylates, and polyvinyl esters. Such compounds are synthesized by condensing aliphatic compounds having a reactive functional group, such as halogen, oxy-halogen, hydroxyl, amino, carboxyl, or olefinic groups, intermolecularly with other aliphatic compounds containing such functional groups or with a cyclic organic compound, such as an aromatic or naphthenic compound, or substituted derivatives thereof.

In the complex condensation products, the condensed aliphatic radicals may be linked directly to carbocyclic rings in the synthesized molecules or may be joined in the synthesized molecules through an olefinic linkage, an ester, ether, keto, or other type of functional group. The condensation reaction may be promoted by a Friedel-Crafts type catalyst, e. g. aluminum chloride, or another type of condensation promoting agent. Preferably the aliphatic reactant used in forming the desired condensation products should contain more than 10 carbon atoms in the molecule and should be reacted in a sufficient proportion to form a relatively high molecular weight compound in which at least 3 to 4 of the long chain aliphatic radicals are present in the synthesized molecule as side chain groups. Thus the resulting polymerized alkylated compounds are broadly describable as polyalkyl compounds.

Specifically among the preferred polyalkyl auxiliary blending agents may be mentioned polyalkyl naphthalene formed most readily by condensing a mol of naphthalene with several mols of halogenated paraffins in the presence of a Friedel-Crafts catalyst, particularly aluminum chloride, the temperature preferably maintained between about 75° F. to about 300° F. In this reaction the halogenated paraffin reactant may be a long chain alkyl chloride, or a relatively lower molecular weight alkyl chloride, in which event, a higher mol proportion of the alkyl chloride reactant is preferably used. The polyalkylmethacrylates are represented by esters of polymethacrylic acid, such as polylaurylmethacrylate. The polyvinyl esters are represented by the ester condensation product of polyvinyl alcohol and of oleic acid, as in polyvinyl oleate. Polyalkyl phenols are condensation products of phenols with halogenated paraffins.

The described auxiliary blending agents when used in conjunction with the modified normal mono-olefin polymers that are suitably miscible with hydrocarbon lubricating oils do not give simply an additive effect with respect to altering the viscosity characteristics of the oil, because such auxiliary blending agents may have little or no effect on the viscosity characteristics of the oil by themselves in the concentrations preferably used. They have a peculiarly advantageous effect when used in certain optimum amounts together with a blend of the modified normal mono-olefin polymers in the lubricating oils, by raising the viscosity index of the blend to a substantially greater degree than would be expected on the basis that these agents acted independently of the normal mono-olefin polymer. The polymer itself is much more effective than any of the agents in raising the viscosity index, and this effectiveness is even doubled when optimum small proportions of both the polymer and auxiliary polyalkyl blending agent are used together.

In order to illustrate the invention, the following examples are given:

*Example 1*

A sample of commercial ethylene polymer was analyzed to have substantially the compositional formula $(C_nH_{2n})$ and to have an intrinsic viscosity of 0.439 (a specific viscosity of 3.41 as determined with a solution of the polymer in tetralin containing 2.78 g. of the polymer per 100 cc. of the solution at 210° F.). This polymer separated out from an S. A. E. 20W lubricating oil having a V. I. of 13, when added thereto in concentrations less than 0.1% by weight, and therefore it could not be used as a blending agent.

*Example 2*

A sample of the polymer described in Example 1 was treated with 5% of aluminum chloride in dichlorobenzene solution at 90°–95° C. for four hours. In this manner, the specific viscosity of the polymer was reduced to 2.17, making a reduction in the intrinsic viscosity from 0.439 to 0.281. However, the thus treated polymer also precipitated out of the reference oil, S. A. E. 20W, V. I. 13, mineral lubricating oil.

*Example 3*

Another sample of the ethylene polymer described in Example 1, was refluxed for a prolonged period of time in the presence of 10% of aluminum chloride in benzene. The resulting modified polymer was recovered from the reaction mixture by precipitation with acetone. This time the specific viscosity of the polymer was reduced to 2.04, making the intrinsic viscosity 0.243 (at 210° F.), which marks approximately the upper limit of usefulness for this type of polymer for the present purposes. The thus modified polymer, despite the lowering in its molecular size, continues to have a solid plastic consistency and is substantially similar in appearance and feel to the original polymer.

The viscosity improving effects of the normal mono-olefin polymers having suitable molecular size for blending with lubricating oils, as for example, the modified polymer described in Example 3, and effects of the auxiliary blending agents are illustrated by summarized test data in the following table:

| Lubricating composition | Saybolt at 100° F. | Viscosity at 210° F. | Viscosity index |
|---|---|---|---|
| Blank (S. A. E. 20W lubricating oil) | 275.8 | 44.2 | 15 |
| *Additive* | | | |
| 0.2% ethylene polymer [η]=0.243 at 210° F. | 242.3 | 45.1 | 28 |
| 0.5% ethylene polymer | 243.7 | 46.4 | 57 |
| 1.0% ethylene polymer | 288.6 | 48.8 | 64 |
| 1.0% polyalkyl naphthalene | 237.2 | 44.7 | 23 |
| 0.2% ethylene polymer+1% polyalkyl naphthalene | 241.6 | 45.6 | 42 |
| 0.2% ethylene polymer+2% polyalkyl naphthalene | 256.6 | 45.6 | 34 |
| 0.2% ethylene polymer+3% polyalkyl naphthalene | 268.7 | 46.5 | 36 |
| 0.2% ethylene polymer+5% polyalkyl naphthalene | 285.2 | 47.5 | 42 |
| 0.5% ethylene polymer+1% polyalkyl naphthalene | 249.7 | 46.7 | 57 |
| 1.0% ethylene polymer+1% polyalkyl naphthalene | 260.5 | 49.1 | 87 |
| 1.0% polylaurylmethacrylate | 261.3 | 46.6 | 35 |
| 0.2% ethylene polymer+1% polylaurylmethacrylate | 270.2 | 47.5 | 54 |
| 1.0% polyvinyl oleate | 258.2 | 46.0 | 35 |
| 0.2% ethylene polymer+1% polyvinyl oleate | 284.9 | 38.4 | 58 |
| 1.0% polyalkyl phenol | 241.8 | 44.6 | 14 |
| 0.2% ethylene polymer+1% polyalkyl phenol | 249.3 | 45.6 | 34 |

In the aforedescribed manner, lubricating oils favorably enhanced in viscosity characteristics are obtained from inferior lubricating oils, particularly from non-paraffinic oils having low pour points but badly needing improvement in viscosity index, e. g. oils having viscosity indices below 50. Such inferior lubricating oils have been improved in accordance with the present invention by the addition of the polymer in optimum amounts to have viscosity indices of the order of 90 to 100, thus making them comparable in this quality to the highest grade of petroleum lubricating oils.

The normal mono-olefin polymers having the correct molecular size for appropriate blending and viscosity improving properties, as indicated, are considered to have outstanding value in oils which are subjected to high temperature service conditions, as for example, internal-combustion engine lubricants, particularly Diesel motor oils, but they may be used advantageously in various petroleum products, including industrial oils, relatively viscous fuels, slushing oils, and the like, having viscosities ranging upwardly from about 30 Saybolt seconds at 100° F. to compositions which are semi-fluid, such as greases.

The oil used as a base in the lubricants may have a viscosity index which is high or low, may comprise fatty oils, natural or synthetic oils, bright stocks, or distillates, and may be finished by one or more types of refining steps, e. g. acid treating, clay refining, dewaxing, solvent extraction, selective precipitation, etc.

Also, other additives may be incorporated in the lubricants, if desired, as for example, stabilizing agents, corrosion inhibitors, oiliness agents, oxidation inhibitors, dyes, soaps, pour point depressants, detergents, sludge dispersers, diluents, and other viscosity index improving agents.

The invention is not restricted to any of the specific examples described, for it is intended to cover variations coming within the scope of the invention and to claim all inherent novelty thereof.

We claim:

1. A lubricant comprising a hydrocarbon lubricating oil blended with a miscible normal mono-olefin polymer having an intrinsic viscosity of from about 0.1 to 0.25 at 210° F. in an amount within the range of 0.1% to 1.0% to improve the viscosity index of the oil.

2. A stable thickened oil composition comprising a low pour point petroleum oil blended with from 0.1 to about 1% by weight of a plastic solid polymer of a normal mono-olefin containing 2 to 3 carbon atoms per molecule, said polymer having an intrinsic viscosity in the range of 0.1 to about 0.25 at 210° F. and being stably miscible with the oil in said proportion to improve the viscosity index of the oil.

3. A lubricant comprising a lubricating oil homogeneously blended with a viscosity index improving amount of a normal mono-olefin polymer having an intrinsic viscosity in the range of 0.1 to about 0.25 at 210° F. and being soluble in said oil in a concentration between 0.1% and 1.0% by weight and an amount of a complex organic auxiliary blending agent comprising a chemical condensation substance containing aliphatic groups, in the range of 0.1% to 1.0% which is compatible with the blend.

4. A lubricant comprising a hydrocarbon lubricating oil blended with 0.1 to 1% by weight of an ethylene polymer having an intrinsic viscosity in the range of 0.1 to 0.25 at 210° F. and an amount of a complex polyalkyl condensation compound within the range of 0.1% to 1.0% which is compatible with the blend of said polymer in said oil.

5. A lubricant as described in claim 4, in which said polyalkyl compound is a polyalkyl naphthalene condensation compound present in a concentration of 0.5 to 1% by weight.

6. An improved lubricating oil comprising a low pour point hydrocarbon lubricating oil blended with from 0.1 to 1% by weight of an ethylene polymer having an intrinsic viscosity in the range of 0.1 to 0.25 at 210° F. and from 0.5 to 1% by weight of polyalkyl naphthalene condensation compound.

7. A lubricant comprising a hydrocarbon lubricating oil blended with an ethylene polymer having an intrinsic viscosity of from 0.1 to 0.25 at 210° F. in a viscosity index improving amount from 0.1% to 1.0% by weight and a polyvinyl ester condensation compound in a sufficient amount to secure further improvement in the viscosity index of the blend.

8. A lubricant comprising a hydrocarbon lubricating oil blended with an ethylene polymer having an intrinsic viscosity of from 0.1 to 0.25 at 210° F. in a viscosity improving amount from 0.1% to 1.0% by weight and a polyalkylmethacrylate condensation compound in an amount within the range of 0.1% to 1.0% to secure a further improvement in the viscosity index of the blend.

WILLIAM J. SPARKS.
RAPHAEL ROSEN.